(12) United States Patent
Huang et al.

(10) Patent No.: US 11,311,138 B2
(45) Date of Patent: Apr. 26, 2022

(54) AUTOMATIC DEVICE FOR BREWING BEVERAGES

(71) Applicant: Taiwan Intelligent Robotics Company, Ltd., Taipei (TW)

(72) Inventors: Kuo-Tsung Huang, Taipei (TW); Chun-Hung Lin, Taipei (TW); Fu-Kuan Hsu, Taipei (TW); Tsan-Ching Huang, Taipei (TW)

(73) Assignee: TAIWAN INTELLIGENT ROBOTICS COMPANY LTD., Taipei (TW)

( * ) Notice: Subject to any disclaimer, the term of this patent is extended or adjusted under 35 U.S.C. 154(b) by 445 days.

(21) Appl. No.: 16/448,466

(22) Filed: Jun. 21, 2019

(65) Prior Publication Data
US 2019/0387919 A1 Dec. 26, 2019

(30) Foreign Application Priority Data
Jun. 22, 2018 (TW) .................. 107121441

(51) Int. Cl.
| | |
|---|---|
| *A47J 31/40* | (2006.01) |
| *A47J 31/00* | (2006.01) |
| *A47J 31/46* | (2006.01) |
| *A47J 31/52* | (2006.01) |
| *A47J 31/44* | (2006.01) |
| *B67D 1/00* | (2006.01) |

(Continued)

(52) U.S. Cl.
CPC .......... *A47J 31/402* (2013.01); *A47J 31/007* (2013.01); *A47J 31/40* (2013.01); *A47J 31/41* (2013.01); *A47J 31/4425* (2013.01); *A47J 31/461* (2018.08); *A47J 31/525* (2018.08); *B67D 1/0041* (2013.01); *A47J 31/002* (2013.01); *F25C 5/00* (2013.01)

(58) Field of Classification Search
CPC ........ A47J 31/40; A47J 31/402; A47J 31/405; A47J 31/41; B67D 1/0041; B67D 3/00; B67C 9/00; F25C 5/00
See application file for complete search history.

(56) References Cited

U.S. PATENT DOCUMENTS

| | | | |
|---|---|---|---|
| 2006/0043111 A1* | 3/2006 | Jennings ................ | B25J 9/0087 222/129.1 |
| 2016/0052770 A1* | 2/2016 | Ratti ...................... | G06Q 20/18 705/15 |
| 2017/0221296 A1* | 8/2017 | Jain ......................... | G07F 11/70 |

(Continued)

*Primary Examiner* — Reginald Alexander
(74) *Attorney, Agent, or Firm* — Muncy, Geissler, Olds & Lowe, P.C.

(57) ABSTRACT

An automatic device for brewing beverages at least comprises an ice cube meter, at least one beverage supply device, at least one robotic arm, a feed conveyor belt, a plurality of feeders, and a film sealing machine, mainly uses the robotic arm to take up ice cubes and a beverage from the ice cube meter and the beverage supply device with a hand-shake cup, then shake and mix, and pour the shaken and mixed beverage and ice cubes into a beverage cup, the beverage cup is conveyed to pass through the feeders by the feed conveyor belt, ingredient is squeezed into the beverage cup by the feeder, and finally the beverage cup containing the beverage, ice cubes and ingredient is conveyed by the feed conveyor belt to the film sealing machine for sealing.

9 Claims, 9 Drawing Sheets

(51) Int. Cl.
*A47J 31/41* (2006.01)
*F25C 5/00* (2018.01)

(56) References Cited

U.S. PATENT DOCUMENTS

| | | | | |
|---|---|---|---|---|
| 2018/0344073 A1* | 12/2018 | Hsu | ....................... | A47J 31/402 |
| 2019/0387768 A1* | 12/2019 | Ezagui | ................... | A23G 9/045 |
| 2021/0087045 A1* | 3/2021 | Carignan | ................... | B41J 3/44 |

* cited by examiner

AUTOMATIC DEVICE FOR BREWING BEVERAGES

BACKGROUND OF THE INVENTION

Field of Invention

The present invention relates to a brewing device for hand-shake beverages, and more particularly to an automatic device for brewing beverages that does not require manual brewing throughout the entire process.

Related Art

According to the statistics of the Taiwan Tea Making Association, the total output value of Taiwanese tea in 2016 is as high as 150 billion yuan, of which the output value of tea related to catering and hand-shake beverage stores is more than 100 billion yuan, the highest among all the Taiwanese tea output values. With the store openings of hand-shake tea brands one after another, the output value in 2017 even reaches double-digit growth. According to statistics, Taiwanese drink 1.2 billion cups of hand-shake tea a year. Therefore, under such a huge business opportunity, not only the old hand-shake tea brands are trying to consolidate their market shares, some artists and large enterprises have also gradually taken positions in the market.

However, although the market for hand-shake beverages (including hand-shake tea) is huge, the speed of entry and elimination is also very fast. Since hand-shake beverages must rely on manual blending, although the proportion prepared by each employee is roughly the same, there will be differences more or less, resulting in variation in the quality of the beverages. In addition, if the mental state of the employee is not in good condition when he mixes the beverages, not only will cause customer complaints due to the speed of blending the beverages being too slow, but it is more likely to cause problem in the loss of raw materials due to preparation errors. In addition, employees must pay attention to cleanliness when mixing beverages to avoid hygiene problems caused by spittle, hair or other foreign matters falling into the beverages.

As mentioned above, currently there are still many drawbacks in the way of relying solely on manual preparation of beverages. In view of this, in order to solve the above problems, the inventor of the present invention actively research, improve and innovate to develop an automatic device for brewing beverages.

SUMMARY OF THE INVENTION

In order to solve the problems of the prior art described above, an object of the present invention is to provide an automatic device for brewing beverages that is capable of mass-producing fast and efficiently, and effectively reducing hygiene concerns.

In order to solve the problems of the prior art described above, another object of the present invention is to provide an automatic device for brewing beverages that is capable of greatly reducing manual errors.

In order to solve the problems of the prior art described above, still another object of the present invention is to provide an automatic device for brewing beverages that is capable of reducing the costs of labor expenditure.

In order to achieve the above objects, the automatic device for brewing beverages of the present invention at least comprises an ice cube meter, at least one beverage supply device, a robotic arm, a feed conveyor belt, a plurality of feeders, and a film sealing machine.

The ice cube meter includes an ice cube supply device, an ice dipper, a metering sensor and a push-rod motor. The ice making or ice cube supply device is disposed above one end of the ice dipper, and the ice dipper is disposed with an ice cube outlet at another end opposite to the end located below the ice making or ice cube supply device. The metering sensor is disposed at a bottom of the end of the ice dipper located below the ice making or ice cube supply device, and the push-rod motor is disposed below the ice dipper, and a push rod of the push-rod motor is pivotally disposed at a middle position of a bottom of the ice dipper.

The beverage supply device comprises a beverage bucket, a weight sensor, at least one suction pump and at least one delivery tube. The weight sensor is disposed at a bottom of the beverage bucket, one end of the delivery tube is connected to the beverage bucket, and another end of the delivery tube opposite to the end connected to the beverage bucket is a beverage outlet. The suction pump is disposed on the delivery tube and electrically connected to the weight sensor.

Each of the feeders includes an ingredient bucket, a three-way valve, a discharge tube, a rationing cylinder, a rationing push rod and at least one rationing sensor. The three-way valve is disposed between the ingredient bucket, the discharge tube and the rationing cylinder. The rationing push rod is disposed at a bottom of the rationing cylinder. The rationing sensor is electrically connected to the three-way valve and the rationing push rod.

A free end of the robotic arm is a clamping jig for clamping a hand-shake cup. The feed conveyor belt is used for conveying a beverage cup to pass through the discharge tubes of the feeders. The film sealing machine is disposed at an end of the feed conveyor belt for sealing the beverage cup passing through the discharge tubes of the feeders.

The automatic device for brewing beverages of the present invention uses the robotic arm to take up ice cubes and beverage with the hand-shake cup, then shake and mix, and pour the shaken and mixed beverage and ice cubes into the beverage cup, and convey the beverage cup to pass through the feeders by the feed conveyor belt, ingredients are squeezed into the beverage cup by the feeders, and finally the beverage cup containing the beverage, the ice cubes and the ingredients is conveyed by the feed conveyor belt to the film sealing machine for sealing. Therefore, manpower is not required in the process of brewing drinks, so costs of labor expenditure can be reduced, and hygiene concerns and errors caused by human factors can be reduced.

DETAILED DESCRIPTION OF THE INVENTION

Figure 1:
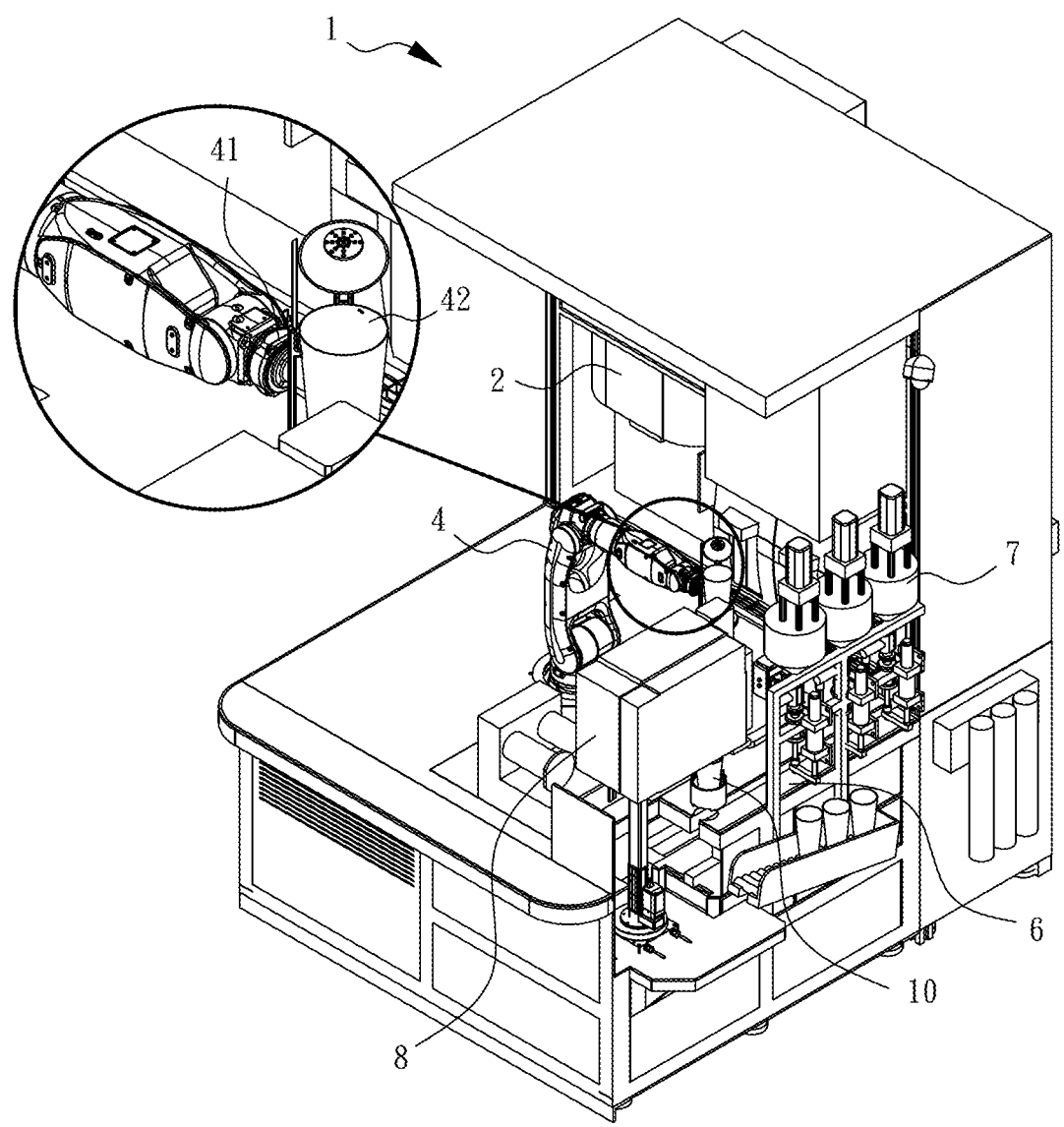
FIG. 1 is a perspective view of an automatic device for brewing beverages of the present invention.
Figure 2:
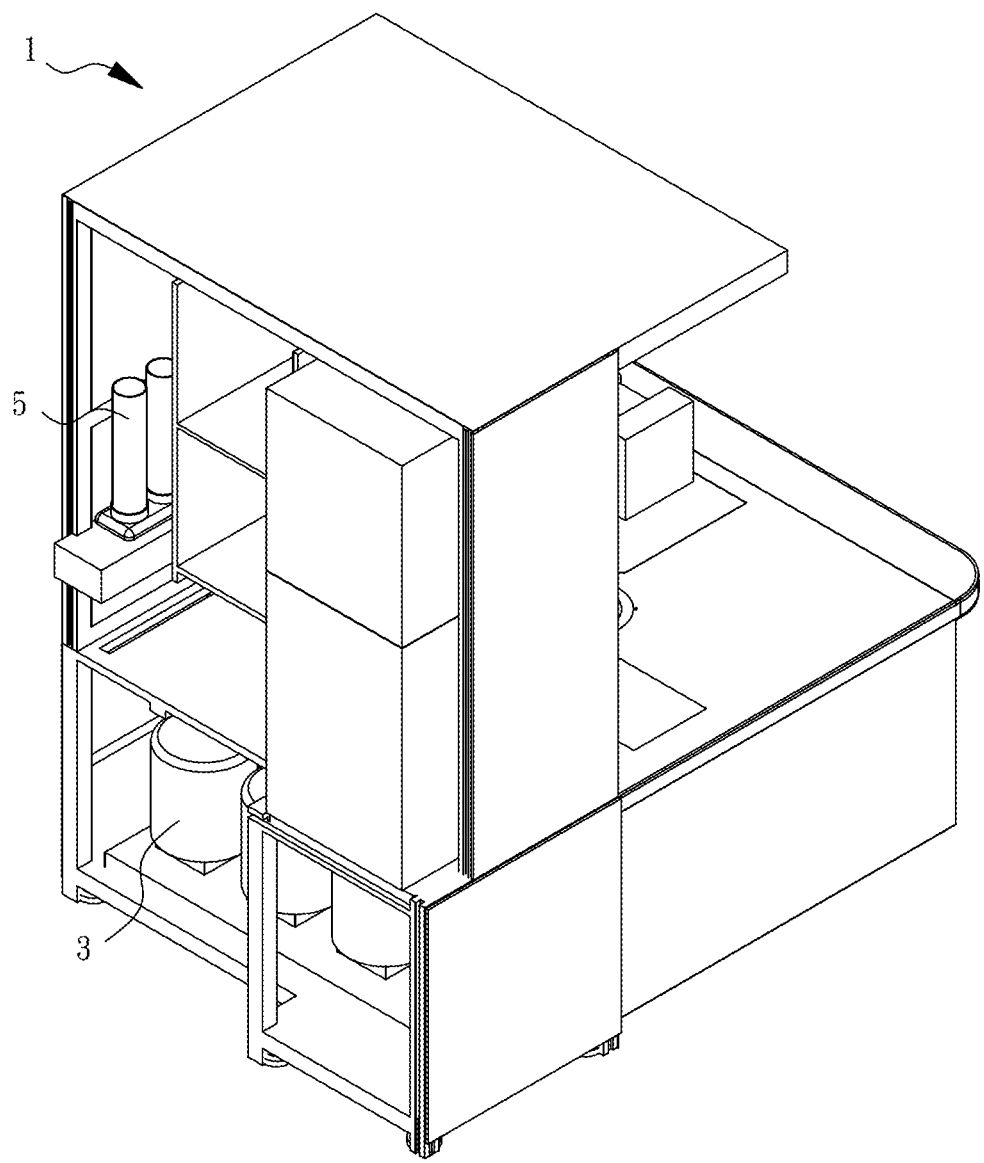
FIG. 2 is a perspective view of another viewing angle of the automatic device for brewing beverages of the present invention.

Please refer to FIGS. 1 to 5 for an automatic device for brewing beverages 1 of the present invention, which mainly comprises an ice cube meter 2, at least one beverage supply device 3, a robotic arm 4, an automatic cup feeder 5, a feed conveyor belt 6, a plurality of feeders 7, a labeling machine (not shown), and a film sealing machine 8.

The ice cube meter 2 includes an ice cube supply device (not shown), an ice dipper 21, a metering sensor 22, and a push-rod motor 23. The ice cube supply device is an ice maker or an ice bucket stored with ice cubes inside. The ice dipper 21 is a container with an upper opening and with a higher end and a lower end, the lower end of the ice dipper 21 is disposed under the ice cube supply device, and the higher end of the ice dipper 21 is disposed with an ice cube outlet 211. The metering sensor 22 is disposed at a bottom of the lower end of the ice dipper 21. The push-rod motor 23 includes at least one motor 231 and a push rod 232, one end of the push rod 232 is connected with the motor 231, and another end of the push rod 232 opposite to the end connected to the motor 231 is pivotally connected to a middle position underneath the ice dipper 21.

Each of the beverage supply devices 3 includes a beverage bucket 31 containing a beverage such as tea or juice, etc., a weight sensor 32, at least one suction pump 33, and at least one delivery tube 34. The weight sensor 32 is disposed below the beverage bucket 31. One end of the delivery tube 34 is connected to the beverage bucket 31, and another end of the delivery tube 34 opposite to the end connected to the beverage bucket 31 has a beverage outlet 341. The suction pump 33 is disposed on the delivery tube 34, and the suction pump 33 is electrically connected to the weight sensor 32.

One end of the robotic arm 4 is disposed on the automatic device for brewing beverages 1 of the present invention, another end of the robotic arm 4 is a free end disposed with a clamping jig 41, and the clamping jig 41 is used for clamping a hand-shake cup 42 to perform shaking and mixing.

The feeders 7 are disposed on the automatic device for brewing beverages 1 of the present invention. Each of the feeders 7 includes an ingredient bucket 71 containing ingredients such as tapioca balls, pudding or konjak, and the like, a stirrer 72, a three-way valve 73, a discharge tube 74, a rationing cylinder 75, a rationing push rod 76 and at least one rationing sensor (not shown). The three-way valve 73 is used for communicating with the ingredient bucket 71, the discharge tube 74 and the rationing cylinder 75. The stirrer 72 is disposed in the ingredient bucket 71 or above the ingredient bucket 71. The rationing push rod 76 is disposed at a bottom of the rationing cylinder 75 and connected to the rationing cylinder 75. The rationing sensor is disposed in the rationing cylinder 75 and electrically connected to the three-way valve 73 and the rationing push rod 76.

The feed conveyor belt 6 is disposed under the discharge tubes 74 of the feeders 7. The automatic cup feeder 5 is disposed at a convey starting point of the feed conveyor belt 6. The film sealing machine 8 is disposed at a convey ending point of the feed conveyor belt 6. The labeling machine is disposed at another side of the feed conveyor belt 6 opposite to a side disposed with the feeders 7.

When the automatic device for brewing beverages 1 of the present invention is used, after the hand-shake cup 42 is clamped by the clamping jig 41 of the robotic arm 4, rationed ice cubes and beverage provided by the ice cube meter 2 and the beverage supply device 3 being taken up by the hand-shake cup 42 are shaken and mixed. At the same time, the automatic cup feeder 5 places the beverage cups 10 on the feed conveyor belt 6 equidistantly. Then the robotic arm 4 pours the shaken and mixed beverage and ice cubes into the beverage cup 10, after replacing the new hand-shake cup 42, rationed ice cubes and beverage provided by the ice cube meter 2 and the beverage supply device 3 being taken up by the hand-shake cup 42 are shaken and mixed, and then the beverage cup 10 containing the shaken and mixed beverage and ice cubes is conveyed by the feed conveyor belt 6 to pass through under the feeders 7. At this time, ingredients are squeezed from the discharge tubes 74 into the beverage cup 10 by the feeders 7 to complete the supply of the ingredients. In addition, in the process of conveying the beverage cup 10 by the feed conveyor belt 6, the labeling machine simultaneously attaches a label printed with the name, contents and pick-up order number, etc. of the beverage on the beverage cup 10. Finally, the beverage cup 10 containing the beverage, ice cubes and ingredients is conveyed by the feed conveyor belt 6 to the film sealing machine 8 for sealing.

Figure 3:
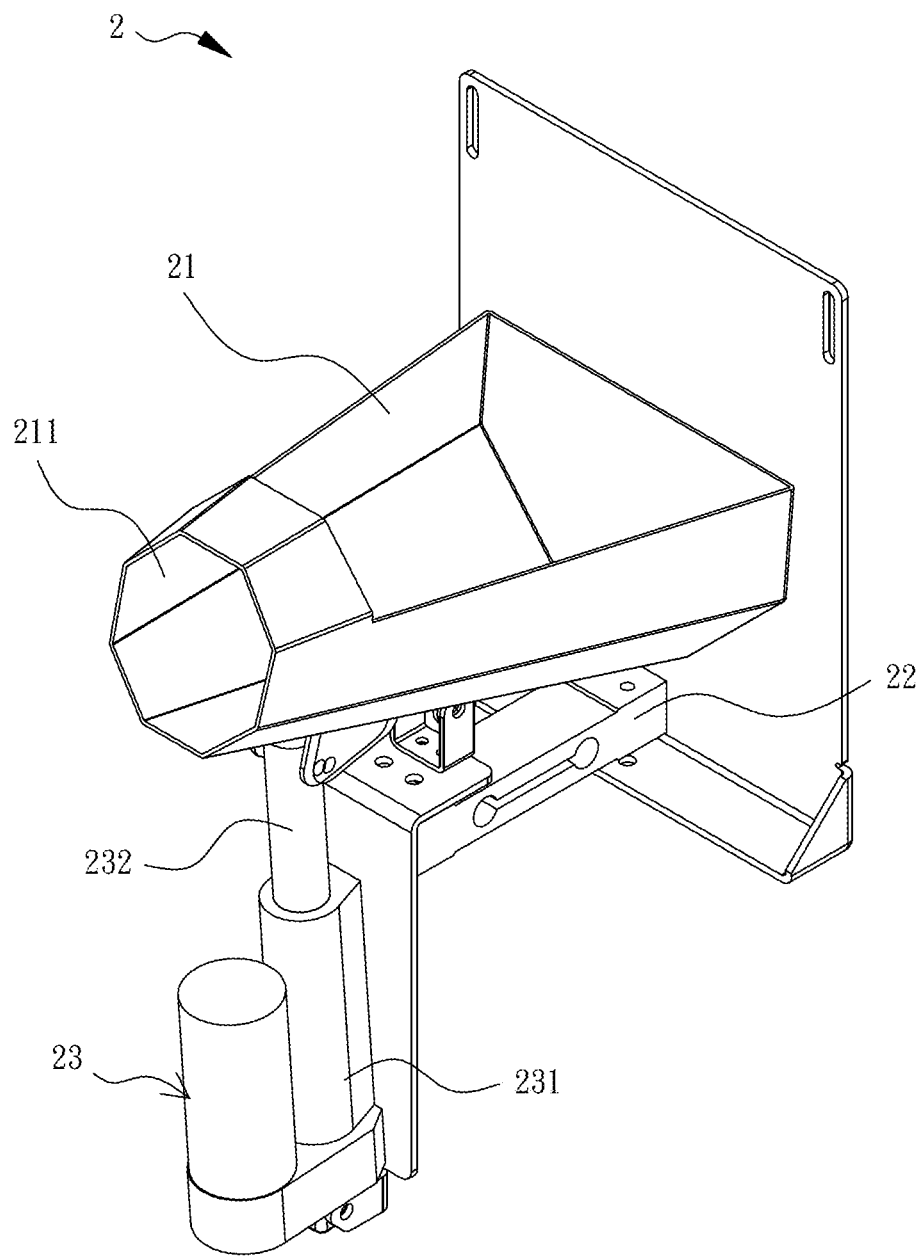
FIG. 3 is a perspective view of an ice cube meter of the present invention.
Figure 6:
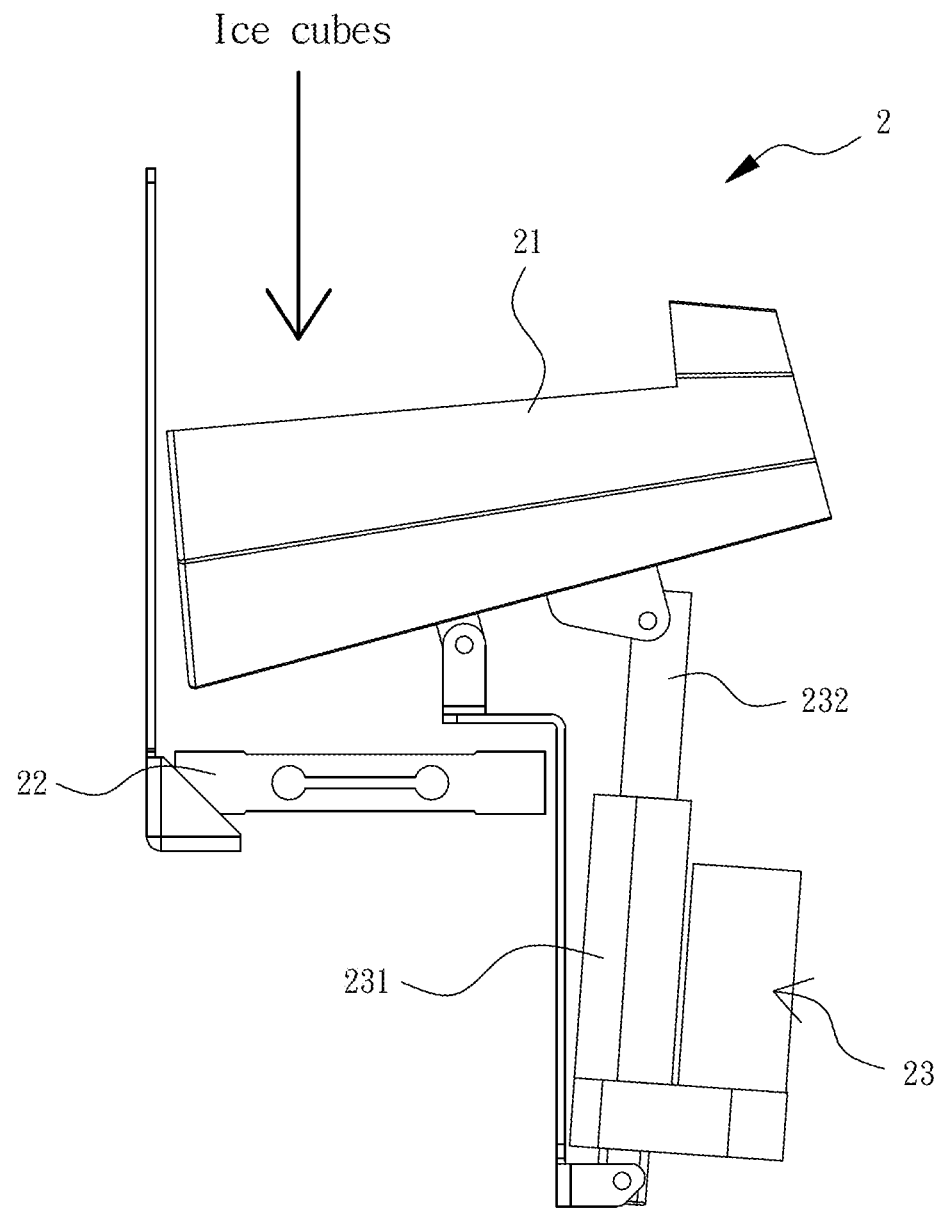
FIG. 6 is a first schematic view of the operation of the ice cube meter of the present invention.
Figure 7:
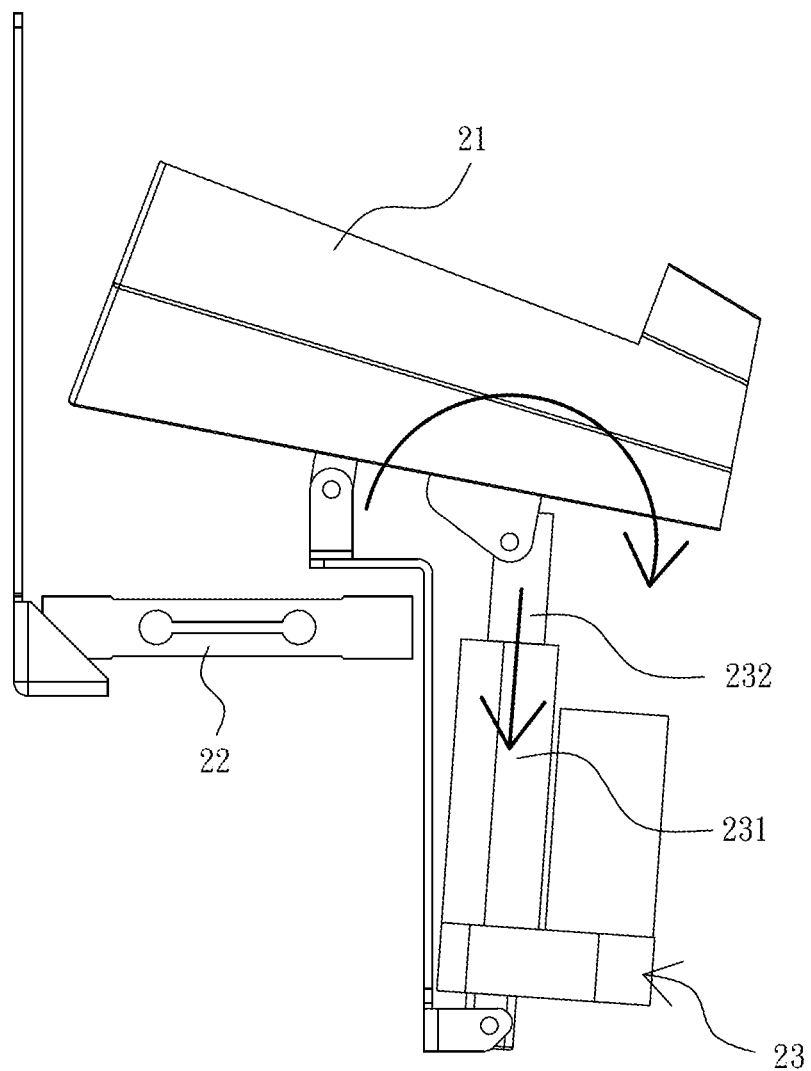
FIG. 7 is a second schematic view of the operation of the ice cube meter of the present invention.

Referring to FIG. 3 and FIGS. 6-7, when the above-mentioned automatic device for brewing beverages 1 of the present invention provides rationed ice cubes by the ice cube meter 2, the ice cubes are poured into the ice dipper 21 by the ice cube supply device, and the metering sensor 22 disposed under the ice dipper 21 measures a weight of the poured ice cubes. When the metering sensor 22 measures that the ice cubes poured into the ice dipper 21 reach a rationed amount (according to a customer's beverage order with a set weight of normal, less, little or zero amount of ice cubes, etc. being reached), the metering sensor 22 notifies the ice cube supply device to stop supplying ice cubes, and activates the push-rod motor 23 to pull the ice dipper 21 downward by the push rod 232 through the motor 231. At this time, the ice dipper 21 rotates about a pivotal position of the push rod 232 and the ice dipper 21 to cause the end provided with the ice cube outlet 211 to incline downward, and the ice cubes in the ice dipper 21 are poured into the hand-shake cup 42 to achieve the purpose of providing ice cubes with a set amount. At the same time, after the ice cubes in the ice dipper 21 are poured into the hand-shake cup 42, the motor 231 pushes the push rod 232 to restore the ice dipper 21 to its original position, and rationed ice cubes are provided according to the next customer's beverage order.

In addition, since the ice dipper 21 in the present invention is a container with the higher end and the lower end, and the ice cube outlet 211 is provided at the higher end of the ice dipper 21, when the ice cube supply device pours the ice cubes into the ice dipper 21, the ice cubes will fall to the lower end of the ice dipper 21 by gravity, and will not fall out from the ice cube outlet 211, which can effectively control the amount of ice cubes to avoid errors.

Figure 4:
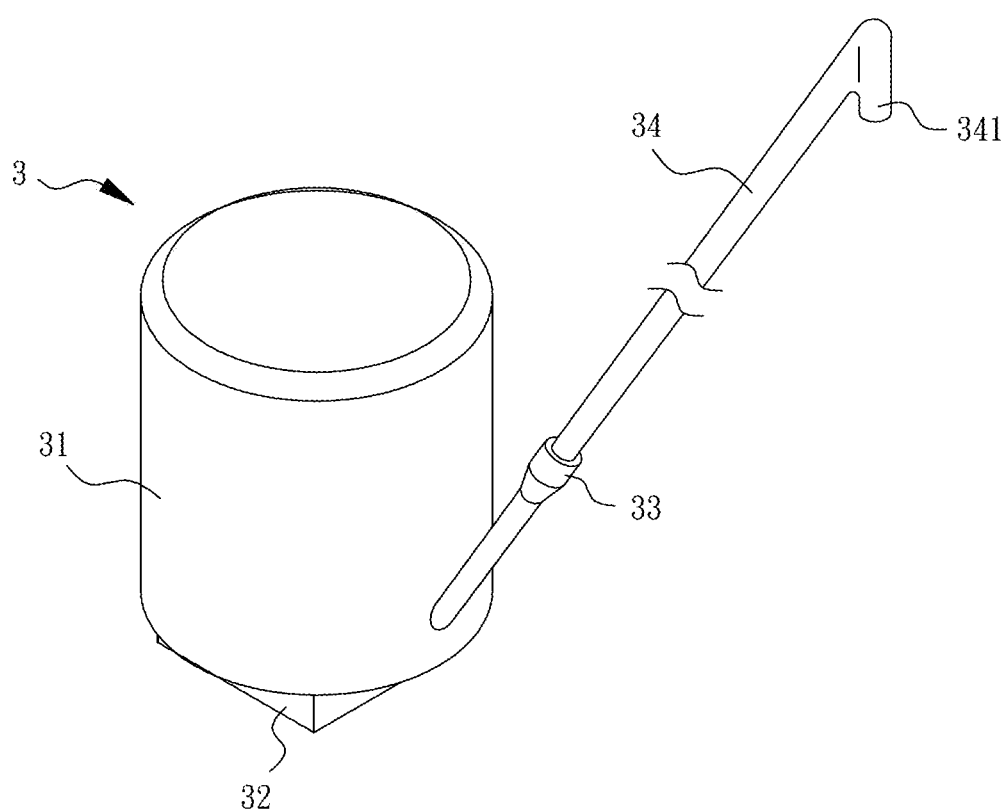
FIG. 4 is a perspective view of a beverage supply device of the present invention.

Referring to FIG. 4, when the above-mentioned automatic device for brewing beverages 1 of the present invention provides a rationed beverage by the beverage supply device 3, the beverage such as tea or juice, etc. contained in the beverage bucket 31 is drawn out by the suction pump 33 through the delivery tube 34 according to the customer's beverage order, and the beverage is filled into the hand-shake cup 42 from the beverage outlet 341. During the process of drawing out the beverage by the suction pump 33, the weight sensor 32 provided at a bottom of the beverage bucket 31 is used to detect a weight of the beverage bucket 31, when the weight of the beverage bucket 31 is reduced to a certain weight due to the amount of beverage that was drawn out, the weight sensor 32 notifies the suction pump 33 to stop, in order to achieve the purpose of providing rationed beverage to the hand-shake cup 42.

In addition, since the beverage bucket 31 containing the beverage is heavier, the present invention places the beverage bucket 31 at a lower position of the automatic device for brewing beverages 1 while drawing out the beverage by the suction pump 33 through the delivery tube 34 to the beverage outlet 341 at a higher position, which can effectively reduce the occurrence of overturning of the beverage bucket 31 during the handling, thereby reducing the difficulty of handling.

Figure 5:
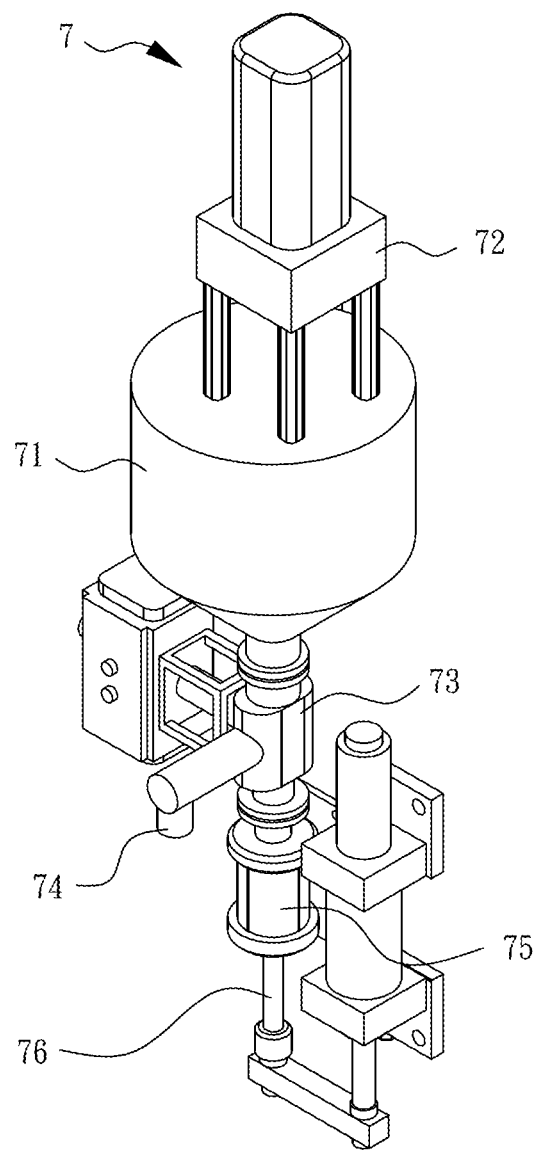
FIG. 5 is a perspective view of a feeder of the present invention.
Figure 8:
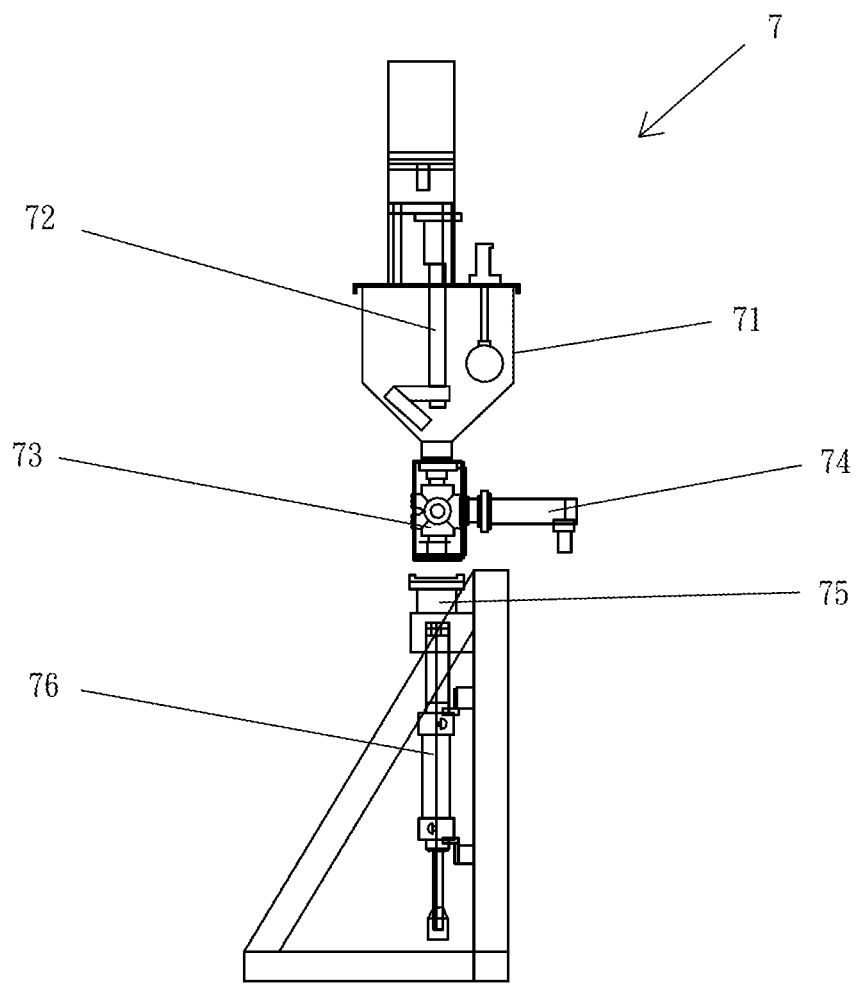
FIG. 8 is a schematic view of the operation of the feeder of the present invention.

Referring to FIG. 5 and FIG. 8, when the above-mentioned automatic device for brewing beverages 1 of the present invention squeezes the ingredients into the beverage cup 10 by the feeders 7 from the discharge tubes 74 according to the customer's beverage order, the beverage cup 10 passes the feeders 7 with the ingredient buckets 71 filled with the different ingredients, and a communication port between the three-way valve 73 and the ingredient bucket 71 as well as a communication port between the three-way valve 73 and the rationing cylinder 75 are opened to cause the ingredient in the ingredient bucket 71 to fall into the rationing cylinder 75. When the rationing sensor senses that the ingredient fallen into the rationing cylinder 75 reaches a certain weight or height, the rationing sensor notifies the three-way valve 73 to close the communication port between the ingredient bucket 71 and the three-way valve 73, and activate the rationing push rod 76 to squeeze the ingredient in the rationing cylinder 75 into the three-way valve 73. At this time, since the communication port between the three-way valve 73 and the ingredient bucket 71 is closed, the ingredient can only be squeezed into the discharge tube 74, and then squeezed into the beverage cup 10 from the discharge tube 74.

In addition, since the ingredients of the hand-shake beverage are mostly adhesive (for example, tapioca balls), the present invention is provided with a stirrer 72 in the ingredient bucket 71 of each of the feeders 7 or above the ingredient bucket 71 of each of the feeders 7. Through mixing by the stirrer 72, the ingredient can be dispersed to avoid the ingredient from being unable to pass through the three-way valve 73 because they are stuck together, resulting in a problem that the ingredient cannot be dropped.

Figure 9:
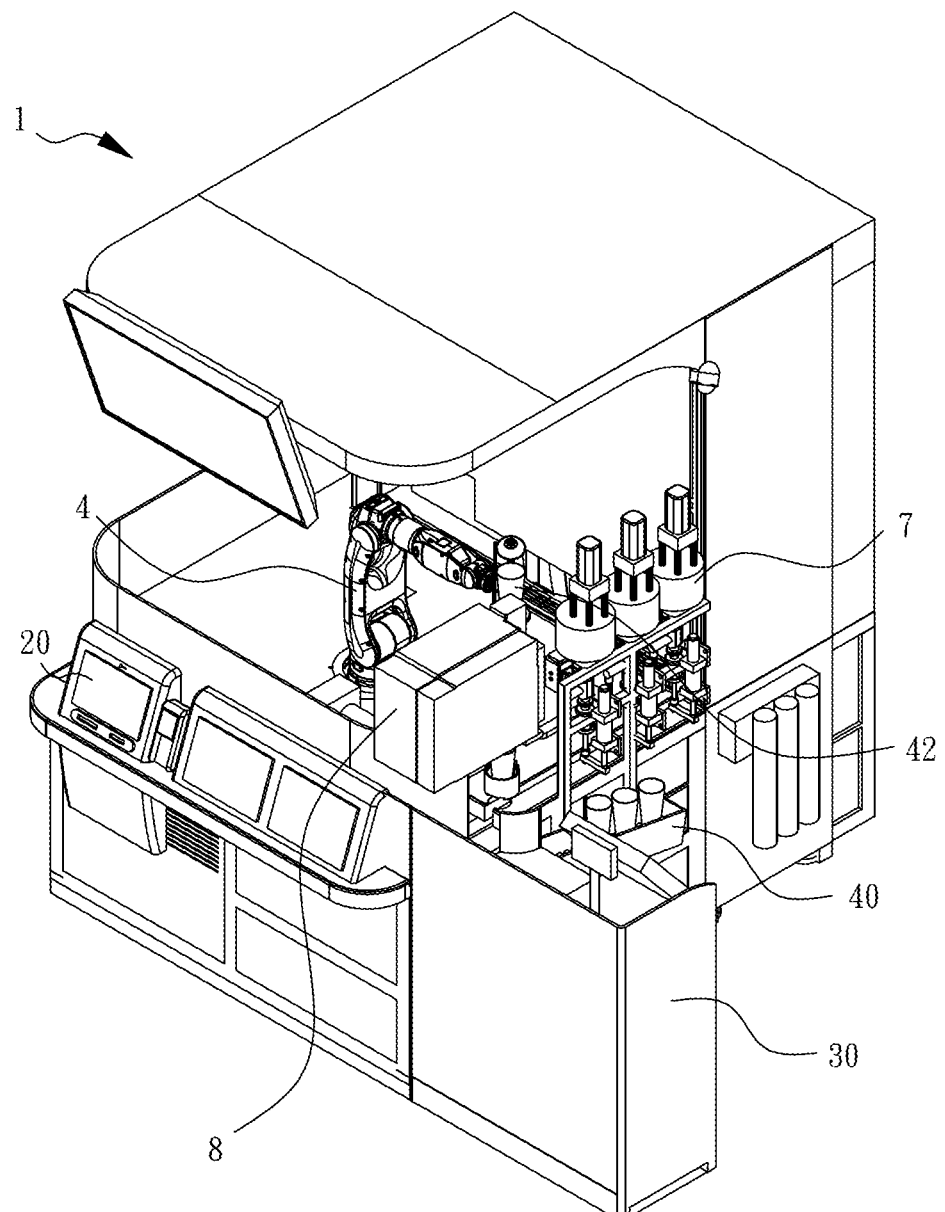
FIG. 9 is a perspective view of another embodiment of the present invention.

In addition, please refer to FIG. 9, which is a perspective view of another embodiment of the present invention. The automatic device for brewing beverages 1 of the present invention can also be provided with an ordering machine 20, a checkout counter 30, a finished product conveyor belt 40 and an automatic cleaning machine (not shown), etc. The ordering machine 20 is for the customers to select a drink by themselves, and provide the drink order selected by the customer to the ice cube meter 2, the beverage supply device 3 and the feeders 7 for the production of the drink. The checkout counter 30 is used for checkout by the counter staff. The finished product conveyor belt 40 is used for conveying and placing the finished beverages to facilitate the counter staff to take or pack, and the automatic cleaning machine is used for cleaning the hand-shake cup 42.

TABLE I

| Average daily sales 300~400 cups/General hand-shake beverages store | Average daily output 400~600 cups/ Store employing the present invention |
|---|---|
| ↑→ ordering/checkout services | automatic, ordering via mobile app and electronic payment by customers |
| ↑→ beverages preparation/ answering phone calls | robot |
| ↑→ blending of beverages | robot |
| ↑→ back workshop (boil tea leaves, cook tapioca pearls, materials preparation) | 1 person➡ boil tea leaves and cook tapioca pearls automatically; materials supplement; handling |
| ↑→ back workshop (materials supplement)/delivery/mobility | delivery not available, delivery via cooperation with UberEats, etc. based on needs |
| average 4-5 persons each shift | minimum 1 person each shift |

As shown in Table 1, during each shift in a general hand-shake beverages store, must arrange at least one person for ordering and checkout services, at least two persons for beverage production (including answering the phone), and at least two persons at the back workshop for materials preparation and delivery service, therefore, a general hand-shake beverages store needs to arrange 4-5 employees for each shift. In contrast, the part of the present invention for making drinks is entirely completed by the automatic device for brewing beverages 1, and the ordering work can be done by the customer on the ordering machine, the checkout part can be carried out by electronic payment at the time of ordering, and the delivery part can cooperate with a delivery company such as UberEats, etc. Therefore, the present invention only needs one person at the back workshop for materials preparation, so the present invention can be more streamlined in terms of costs of labor expenditure than the general hand-shake beverages store, and since the production of beverages is done completely based on the customer's selected beverage order by the automatic device for brewing beverages 1, so there is no need for personnel to operate during the beverage making process. Therefore, there will be no tiredness of staffs in the process of making drinks, compared to beverages prepared by two employees at the same time, the daily output can be increased by more than 30%. At the same time, it can avoid errors in preparation caused by personnel's negligence, consumer disputes can be effectively reduced, and during the production process, the personnel do not have contact with the beverages, ice cubes and ingredients at all, thus customers' doubts about hygiene can be avoided. Moreover, the present invention also carries out filling of ingredients of other beverages as well as labeling and sealing procedures while shaking and mixing new beverages and ice cubes, which is equivalent to preparing beverages by a few personnel at the same time, so beverages can be made quickly and in large quantities.

Therefore, compared with the conventional method of making hand-shake beverages manually, the present invention not only has the advantages of being quick and effective, capable of mass-producing drinks, capable of reducing the costs of labor expenditure, and also capable of effectively reducing the chance of occurrence of personnel's negligence. The present invention is fully complied with the statutory patent requirements of novelty and non-obviousness, and therefore the application is submitted in accordance with the laws.

While the preferred embodiments of the invention have been set forth for the purpose of disclosure, modifications of the disclosed embodiments of the invention as well as other embodiments thereof may occur to those skilled in the art.

Accordingly, the appended claims are intended to cover all embodiments which do not depart from the spirit and scope of the invention.

What is claimed is:

1. An automatic device for brewing beverages, at least comprising:
    an ice cube meter, the ice cube meter being used for providing rationed ice cubes;
    at least one beverage supply device, the beverage supply device being used for providing a rationed beverage;
    at least one robotic arm, a free end of the robotic arm clamping a hand-shake cup for using the hand-shake cup to take up the ice cubes provided by the ice cube meter and the beverage provided by the beverage supply device, and then shaking and mixing and pouring into a beverage cup of a plurality of beverage cups placed and conveyed on a feed conveyor belt;
    a plurality of feeders, the feeders being disposed on one side of the feed conveyor belt for adding ingredients into the beverage cup when the beverage cup containing the beverage and the ice cubes passing through; and
    a film sealing machine, the film sealing machine being disposed at an end of the feed conveyor belt for sealing a rim of the beverage cup;
    wherein the ice cube meter at least includes an ice dipper, a push-rod motor and a metering sensor, an end of the ice dipper has an ice cube outlet, the metering sensor is disposed at a bottom of another end of the ice dipper opposite to the end disposed with the ice cube outlet, the push-rod motor is disposed below the ice dipper, and a push rod of the push-rod motor is pivotally disposed at a middle position of a bottom of the ice dipper.

2. The automatic device for brewing beverages as claimed in claim 1, wherein the free end of the robotic arm is a clamping jig, and the hand-shake cup is clamped by the clamping jig.

3. The automatic device for brewing beverages as claimed in claim 1, wherein the beverage supply device comprises a beverage bucket, a weight sensor, at least one suction pump and at least one delivery tube, the weight sensor is disposed at a bottom of the beverage bucket, one end of the delivery tube is connected to the beverage bucket, and another end of the delivery tube opposite to the end connected to the beverage bucket is a beverage outlet, and the suction pump is disposed on the delivery tube and electrically connected to the weight sensor.

4. The automatic device for brewing beverages as claimed in claim 1, wherein each of the feeders at least includes an ingredient bucket, a three-way valve, a discharge tube, a rationing cylinder and a rationing push rod, the three-way valve is disposed between the ingredient bucket, the discharge tube and the rationing cylinder, the rationing push rod is disposed at a bottom of the rationing cylinder, when the ingredient in the ingredient bucket falls into the rationing cylinder through the three-way valve to reach a certain amount, the three-way valve closes the communication with the ingredient bucket, and the rationing push rod pushes the rationing cylinder to push the ingredient in the rationing cylinder out from the discharge tube.

5. The automatic device for brewing beverages as claimed in claim 4, wherein inside the rationing cylinder is disposed with at least one rationing sensor, the rationing sensor is electrically connected to the three-way valve and the rationing push rod, the rationing sensor is used for detecting a weight or a height of the ingredient fallen into the rationing cylinder, and when the ingredient fallen into the rationing cylinder reaches a certain weight or height, after the communication between the three-way valve and the ingredient bucket is closed, the rationing push rod is activated to push the ingredient in the rationing cylinder out from the discharge tube.

6. The automatic device for brewing beverages as claimed in claim 4, wherein each of the feeders further includes a stirrer, the stirrer is disposed above the ingredient bucket for stirring the ingredient in the ingredient bucket.

7. The automatic device for brewing beverages as claimed in claim 1, wherein further comprising an automatic cup feeder, the automatic cup feeder being used for placing the empty beverage cups on the feed conveyor belt equidistantly for the robotic arm to pour a beverage and ice cubes into the beverage cups.

8. The automatic device for brewing beverages as claimed in claim 1, wherein further comprising a labeling machine, the labeling machine being disposed at another side of the feed conveyor belt opposite to a side disposed with the feeders for attaching a label of contents of the cup of beverage on the beverage cup.

9. The automatic device for brewing beverages as claimed in claim 1, wherein further comprising a finished product conveyor belt, the finished product conveyor belt being used for conveying the sealed beverage cup containing the beverage, the ice cubes and the ingredient to an outlet of the automatic device for brewing beverages.

* * * * *